G. A. HOWE.
SELF REGISTERING VALVE STEM.
APPLICATION FILED DEC. 20, 1912.
1,086,296.
Patented Feb. 3, 1914.
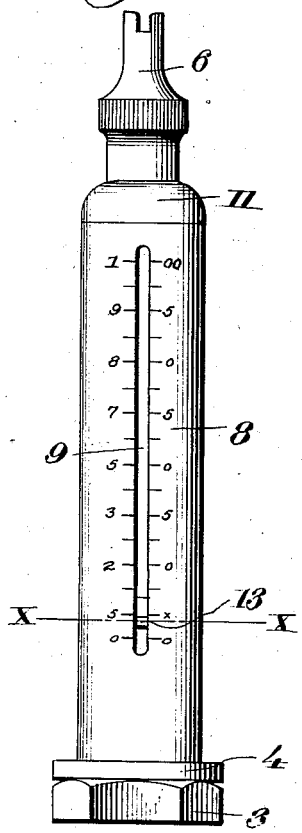
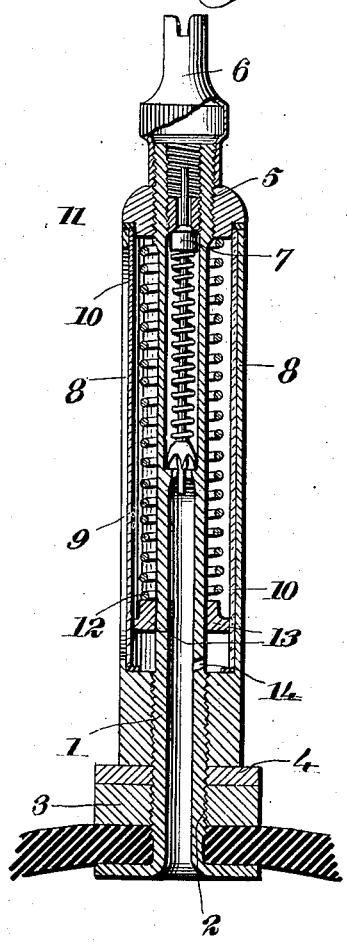
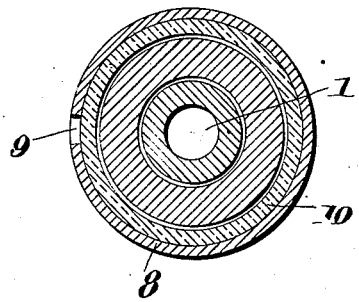
Inventor
G. A. Howe
By Victor J. Evans
Attorney
Witnesses
Raymond L. Gilbert
V. B. Hillyard.

UNITED STATES PATENT OFFICE.

GLENN A. HOWE, OF SALEM, OREGON.

SELF-REGISTERING VALVE-STEM.

1,086,296.  Specification of Letters Patent.  Patented Feb. 3, 1914.

Application filed December 20, 1912. Serial No. 737,893.

*To all whom it may concern:*

Be it known that I, GLENN A. HOWE, a citizen of the United States, residing at Salem, in the county of Marion and State of Oregon, have invented new and useful Improvements in Self-Registering Valve-Stems, of which the following is a specification.

It is desirable when inflating pneumatic tires and other devices to ascertain the number of pounds pressure, this being of special advantage to the proper inflation of pneumatic tires to prevent rim cuts or weakening of the tire by over inflation. This is usually accomplished by indicating devices which for the most part require the air pump or inflating device to be disconnected and the indicator fitted to the valve stem.

The present invention provides a valve stem which indicates the pressure so that the operation of inflating may be discontinued at the proper moment, thereby enabling the work to be rapidly and accurately performed.

In accordance with this invention the valve stem has a barrel fitted thereto in which is arranged to operate a piston, the latter being acted upon by means of a spring and caused to move in the barrel by air pressure derived from the tire or other article being inflated, the piston serving in conjunction with a scale on the barrel to indicate the internal pressure.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a side view of an air valve such as commonly used for pneumatic tires and like articles embodying the invention. Fig. 2 is a vertical central section of the valve. Fig. 3 is a horizontal section on the line $x-x$ of Fig. 1.

Corresponding and like parts are referred to in the following description, and indicated in all the views of the drawing, by the same reference characters.

The valve illustrated is of ordinary construction such as commonly provided for pneumatic tires and comprises a stem 1 flanged at its inner end and having its inner portion threaded, as indicated at 2, to receive a clamp nut 3 and rim washer 4. The outer end of the stem 1 is threaded in the usual manner, as indicated at 5, and receives the closing cap 6. The usual valve 7 is fitted within the outer portion of the stem 1 and prevents the escape of the air forced through the stem into the article to be inflated.

A tubular body 8 is fitted upon the valve stem 1 and constitutes a barrel, the same having a uniform bore. The inner end of the tubular body or barrel is threaded upon the inner end of the valve stem 1. A longitudinal slot 9 is formed in a side of the tubular body or barrel 8 and a scale appears at each side of the slot 9. A tube 10 of glass or other transparent material forms a lining to the barrel 8 and is confined therein between an inner shoulder near the inner end of the barrel and a cap 11, which latter is threaded upon the outer portion of the stem 1. The cap 11 besides confining the lining 10 also closes the outer end of the barrel and forms an abutment for the outer end of an expansible spring 12 which is located in the barrel. A piston 13 fitting within the barrel receives the pressure of the spring 12. This piston fits close upon the stem and within the barrel so as to prevent any loss of air. An opening 14 near the inner end of the stem 1 establishes communication between said stem and the barrel.

The valve does not differ in operation from the ordinary valve and when it is required to inflate the tire the cap 6 is removed and the tube of the air pump coupled to the outer end of the stem. As the tire or other article is inflated the pressure within the inner end of the barrel 8 is the same as that of the tire, hence the piston 13 is moved outward and upon reference to the scale at the side of the slot 9 the pressure within the tire may be determined. After the tire has been inflated to the required degree the tube directing the air into the valve stem may be disconnected therefrom and the cap 6 replaced.

It is noted that the pressure within the tire may be determined at any time by reference to the indicating means, thereby enabling the condition to be ascertained instantly at any time so that a slow leak may be determined or loss of air ascertained at a moment's notice without requiring the use of a separate indicating means which is not always convenient.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A self registering valve for pneumatic articles, the same comprising a hollow stem, a fixed barrel receiving the stem and spaced therefrom, said barrel and stem being in communication at their inner ends, a piston snugly fitting within the space formed between the stem and barrel and adapted to be moved outward by the pressure of the air contained in the article to be inflated, cushioning means normally exerting a pressure to hold the piston in given position, pressure indicating means of which the piston constitutes a part and a valve mechanism arranged within the hollow stem to prevent the escape of air therethrough from the article inflated.

2. A self registering valve comprising a hollow stem having a lateral opening in its inner end, a valve mechanism arranged within the stem for preventing the escape of air pressure therethrough, a fixed barrel of rigid material having connection at its ends with the hollow stem and spaced from the latter and in communication therewith through the said lateral opening, said barrel being provided with scale graduations, a piston snugly fitting the space formed between the stem and barrel and adapted to be moved outwardly by the pressure of the air contained in the article to be inflated and acting jointly with the scale graduations to indicate the air pressure, and a spring arranged within the barrel and normally exerting a pressure upon the piston to hold it in given position.

In testimony whereof I affix my signature in presence of two witnesses.

GLENN A. HOWE.

Witnesses:
    FRED S. BYNON,
    LOUIS BECHTEL.